July 2, 1957     M. P. P. BERARD     2,797,805

SUPPOSITORY CONTAINER

Filed Feb. 15, 1954

INVENTOR.
MARIA PIA PASQUALINI
BERARD

United States Patent Office 2,797,805
Patented July 2, 1957

2,797,805
SUPPOSITORY CONTAINER
Maria Pia Pasqualini Berard, Milan, Italy
Application February 15, 1954, Serial No. 410,286
Claims priority, application Italy February 16, 1953
5 Claims. (Cl. 206—63.2)

This invention relates to an improved container and particularly to an improved container for suppositories.

It is an object of the present invention to provide an improved container which is air-tight and dust-free and which may be readily opened.

It is a further object of the present invention to provide an improved container having the above characteristics and which may also be used as a mold for the manufacture of medicinal products such as suppositories.

With the above objects in view, the present invention mainly consists of a first member formed of a thermoplastic substance and a second member formed of a thermoplastic substance. The members are joined together, for example, by fusing so as to form a hollow container. The respective members are formed with complementary depressed portions along complementary parts of their edge surfaces, which portions form together an indentation suitable for the insertion of a blade. A blade, when inserted into the indentation and used to pry the container apart causes the latter to open along said edge surfaces.

In a preferred embodiment of the invention the two members are formed with fins which may be grasped by the fingers in order to separate the two members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

In the drawing like indentifying letters refer to like elements.

Figure 2:
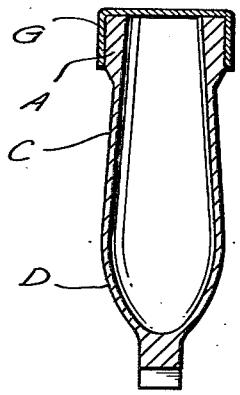
Fig. 2 is a cross-sectional view along line 2—2 of Fig. 1.
Figure 1:
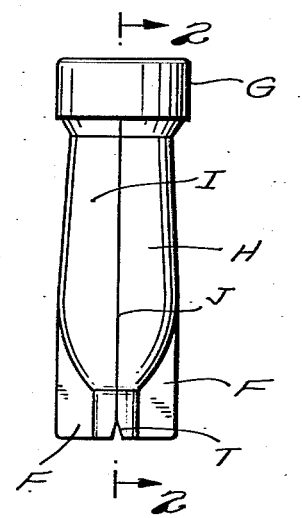
Fig. 1 is a plan view of a container in accordance with the invention.
Figure 3:
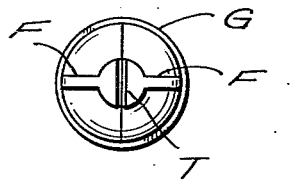
Fig. 3 is a plan view of the bottom of the container illustrated in Fig. 1.

Referring now to the drawing, there is shown a container formed of two parts H, I. The two parts are made of a stiff thermoplastic substance such as, for example, polystyrol or polyethylene. The two parts are detachably joined together as, for example, by fusing the two parts together along complementary edge faces J. The container is shaped so as to provide a convenient container for a suppository, that is, the bottom portion D is somewhat pointed and the intermediate portion C is cylindrically shaped. To provide reinforcement, the top end A of the container is made of somewhat increased thickness. The container is provided with a cap G and with fins F the latter providing a convenient means for grasping the two halves of the container and also providing a certain additional degree of reinforcement for the container. The complementary joining faces of the two container halves are provided at the bottom portion of the container with depressed portions which form a convenient indentation T in which a knife blade or other pointed objects may be inserted in order to pry the container open.

In the manufacture of suppositories, the two halves I, H of the container are first detachably joined together at their complementary faces. The paste of which the suppository is made is poured into the open top of the container and the paste is then allowed to harden. The cap G is then secured in place by means of an adhesive substance or by means of a forced fit or, if desired, the top portion of the container and the cap may be formed with complementary engaging threads. The container provides a convenient package in which the suppository may be shipped to the retailer and also forms a rather attractive display.

When the consumer wishes to utilize the suppository, he merely inserts a knife blade or other convenient instrument into the indentation T and pries the container apart. When the container opens, it opens along the line J which defines the complementary faces of the two container halves.

It will be understood that each of the elements described above, or two or more together, may also find a useful application in other types of containers differing from the types described above.

While the invention has been illustrated and described as embodied in containers for suppositories, it is not intended to be limited to the details shown, since various modifications and structural changes may be made without departing in any way from the spirit of the present invention.

What is claimed as new and desired to be secured by Letters Patent is:

1. A hollow container comprising, in combination, a pair of container parts made of stiff thermoplastic material and having complementary abutting narrow edge faces detachably joined to each other in a predetermined plane, each of said container parts including stiff fin means extending outwardly and transversely with respect to said plane, said container parts being formed with opposite bevel portions intermediate said fin means, said bevel portions defining together a wedge-shaped indentation in said plane for guiding the edge of a knife blade between said edge faces for prying apart the container parts along said plane.

2. A hollow container comprising, in combination, a pair of container parts made of stiff thermoplastic material having complementary abutting narrow edge faces and extensions at one end thereof, said narrow edge faces and said extensions being detachably joined to each other in a predetermined plane, each of said container parts including rigid fin means extending outwardly from said container parts and from said extensions and transversely in respect to said plane, said extensions being formed with opposite beveled portions intermediate said fin means, said bevel portions defining together a wedge-shaped indentation in said plane for guiding the edge of a knife blade between said edge faces for prying apart the container parts along said plane.

3. A hollow container comprising, in combination, a pair of container parts made of stiff thermoplastic material and having complementary abutting narrow edge faces detachably joined to each other in a predetermined plane, each of said container parts including stiff fin means extending outwardly and transversely with respect to said plane, said container parts being formed with opposite bevel portions intermediate said fin means, said bevel portions defining together a wedge-shaped indentation in said plane for guiding the edge of a knife blade between said edge faces for prying apart the container parts along said plane, the other end of said container being open; and a cap secured to said container and covering said other open end thereof.

4. A hollow container comprising, in combination, a pair of container parts made of stiff thermoplastic material having complementary abutting narrow edge faces and extensions at one end thereof, said narrow edge faces and said extensions being detachably joined to each other in a predetermined plane, each of said container parts including rigid fin means extending outwardly from said container parts and from said extensions and transversely in respect to said plane, said extensions being formed with opposite beveled portions intermediate said fin means, said bevel portions defining together a wedge-shaped indentation in said plane for guiding the edge of a knife blade between said edge faces for prying apart the container parts along said plane, the other end of said container being open; and a cap secured to said container and covering said other open end thereof.

5. A hollow container comprising, in combination, a pair of container parts made of thermoplastic material and having complementary abutting narrow edge faces detachably joined to each other in a predetermined plane, each of said container parts including stiff fin means extending outwardly and transversely with respect to said plane, said container parts being formed with opposite bevel portions intermediate said fin means, said bevel portions defining together a wedge-shaped indentation in said plane for guiding the edge of a knife blade between said edge faces for prying apart the container parts along said plane.

References Cited in the file of this patent

UNITED STATES PATENTS

| | | |
|---|---|---|
| 1,438,487 | Greene | Dec. 12, 1922 |
| 2,012,535 | Herrold | Aug. 27, 1935 |
| 2,334,600 | Boysen | Nov. 16, 1943 |
| 2,397,051 | Scherer | Mar. 19, 1946 |
| 2,634,857 | Weckesser | Apr. 14, 1953 |
| 2,648,463 | Scherer | Aug. 11, 1953 |
| 2,649,392 | Marshall | Aug. 18, 1953 |

FOREIGN PATENTS

| | | |
|---|---|---|
| 85,137 | Sweden | Dec. 24, 1935 |
| 1,049,901 | France | Aug. 26, 1953 |